United States Patent [19]

Van Kuijk

[11] Patent Number: 5,180,546
[45] Date of Patent: Jan. 19, 1993

[54] BOILING WATER REACTOR WITH DOWNCOMER STEAM RELEASE CHANNEL

[75] Inventor: Rudolf M. Van Kuijk, Cupertino, Calif.

[73] Assignee: General Electric Company, San Jose, Calif.

[21] Appl. No.: 777,465

[22] Filed: Oct. 17, 1991

Related U.S. Application Data

[63] Continuation of Ser. No. 611,320, Nov. 13, 1990, abandoned, which is a continuation of Ser. No. 408,003, Sep. 15, 1989, abandoned.

[51] Int. Cl.$^5$ ............................ G21C 15/00; G21C 15/16
[52] U.S. Cl. ..................................... 376/371; 376/373; 376/377; 376/210
[58] Field of Search ................ 376/210, 211, 370-375, 376/377-380, 406

[56] References Cited

U.S. PATENT DOCUMENTS

| | | |
|---|---|---|
| 2,994,657 | 8/1961 | Petrick . |
| 3,034,977 | 5/1962 | Holl et al. . |
| 3,041,264 | 6/1962 | Ricard . |
| 3,087,881 | 4/1963 | Treshow . |
| 3,247,650 | 4/1966 | Kornbichler . |
| 3,253,999 | 5/1966 | Weisman . |
| 3,284,312 | 11/1966 | West . |
| 3,378,456 | 4/1968 | Roberts . |
| 4,146,423 | 3/1979 | Karker et al. . |
| 4,576,784 | 3/1986 | Kobayashi .......................... 376/377 |
| 4,663,116 | 5/1987 | Masuhara et al. .................. 376/377 |

FOREIGN PATENT DOCUMENTS 0155391 12/1979 Japan .................................. 376/210

*Primary Examiner*—Harvey E. Behrend
*Attorney, Agent, or Firm*—Robert R. Schroeder

[57] ABSTRACT

A natural circulation boiling water reactor system using free-surface steam separation incorporates a series of tubes near the inner wall of its reaction vessel extending from a downcomer to well-above the downcomer. These tubes allow steam bubbles which would otherwise be trapped within the downcomer to escape from the recirculating water toward the steam exit of the vessel. This lowers the volume of steam in the downcomer, lowering the water velocity required to maintain a given volume of water recirculation. The reduced water velocity results in less carryunder which results in smaller voids in the reactor core. The smaller voids provide longer fuel burnups and enhance reactor stability.

2 Claims, 2 Drawing Sheets

BOILING WATER REACTOR WITH DOWNCOMER STEAM RELEASE CHANNEL

This is a continuation of copending application Ser. No. 07/611,320 filed Nov. 13, 1990, now abandoned, which was in turn a continuation of then copending application Ser. No. 07/408,003 filed Sep. 15, 1989, now abandoned.

BACKGROUND OF THE INVENTION

The present invention relates to energy generation systems and, more particularly, to a natural convection boiling water reactor where the reactor can be a fission reactor. Specifically, the present invention applies to boiling water reactors which use a chimney to augment coolant circulation and which use free-surface steam separation to extract the steam phase used to deliver energy from the recirculating water phase. A major objective of the present invention is to provide for enhanced energy transfer by reducing carryunder in the fluid circulating in a reactor vessel.

In a boiling water reactor, heat generated by a radioactive core can be used to boil water to produce steam, which in turn can be used to drive a turbine to generate electricity. Natural convection boiling water reactors limit complexity by dispensing with the need for pumping water within the reactor vessel. The nuclear core which generates heat is immersed in water within the reactor vessel. Water circulated up through the core and a chimney above the core is at least partially converted to steam which forms a relatively low pressure head above the core. Water recirculates down a downcomer annulus between the reactor vessel and the chimney plus core assembly. The water in the downcomer is denser than the steam plus water mixture in the core and chimney region. The difference in density forces circulation up through the core and chimney and down through the downcomer.

The chimney directs the steam water mixture vertically from the core. This vertical direction is best effected where the chimney includes multiple vertical sections, each of which serves as a chimney for the portion of the core directly below it. Confining the steam path in this way helps maintain a head of steam above the core, facilitating water circulation.

The steam emerging from the chimney top rises through the water in the reactor vessel and exits through a steam nozzle at the vessel top. Typically, a flat annular array of dryers is disposed near the vessel top to trap any water being carried by the steam and return trapped water to the recirculation fluid. Otherwise, water carried by the steam would limit the efficiency with which the steam can drive a turbine or other energy conversion device. Since there is a net loss of water plus steam from the vessel through the exit port, means are provided to replenish the water in the vessel. This is normally accomplished by returning condensation from the turbine using a fluid handling system, including a feed pump which pumps water through a feedwater sparger which distributes subcooled return water around the downcomer.

"Carryunder", which refers to steam carried in the flow of water recirculating within the vessel and through the core, adversely affects the performance of a natural convection boiling water reactor. Carryunder comprises steam bubbles which have a high thermal energy per unit mass so that they can impair the subcooling provided through the feedwater sparger. The result is a higher water temperature at the core entrance and more rapid boiling of the recirculation fluid as it flows up through the core. The more rapid boiling enlarges the steam voids within the core. The larger voids result in higher irreversible pressure drops through the fuel bundle than would be the case with smaller voids. This effect is amplified, since the larger voids tend to choke recirculation flow, despite a higher driving head. These irreversible head losses can be compensated in the design stage by providing greater chimney height, but this results in a bigger vessel and significantly greater reactor costs.

In addition, the larger voids adversely affect core stability, as the stability-decay ratio is dependent on the proportion of two-phase pressure drop to single-phase pressure drop. This lower stability must be addressed by limiting the power production level below what might otherwise be obtainable. Furthermore, the larger voids create a negative reactivity, requiring the control rods to be withdrawn farther from the core. This reduces the opportunity to achieve long fuel burnups for a given initial core enrichment.

Carryunder results from the inadequate separation of steam and water. Given sufficient time, the different densities of steam versus water would allow adequate separation. In practice, steam is swept along with the radially outward and then downward water flow too rapidly for complete separation. The time available for water and steam to separate can be increased either by reducing the recirculation rate or by increasing the volume available for steam/water separation. However, water flow impacts core void size and thus the efficiency with which neutrons generate heat. As an alternative, the reactor vessel can be made larger to accommodate more voluminous recirculation paths within the vessel. However, enlarging the vessel not only increases the cost of the vessel, but also requires geometrically larger versions of the multiple containment systems provided for a reactor vessel. Large containment systems require more materials, more maintenance, and greater potential exposure of personnel to nuclear radiation or contaminants.

Significant reductions in carryunder have been effected in a reactor system with a height-staggered chimney in conjunction with an elevation-staggered dryer system, as disclosed in U.S. patent application No. 325,839, filed Mar. 20, 1989. The more central chimney sections are taller than the more peripheral chimney sections. The staggered chimney consumes less vessel volume due to the stagger and the volume saved is available to increase the time available for steam to separate from water flow. The disclosed reactor also reduces "carryover", the water trapped in the steam flow to the turbine. This carryover, which can damage the turbine and reduce its efficiency, is addressed using a staggered elevation dryer which increases the volume and hence time available for water to separate from the flow of steam exiting the vessel.

The foregoing advances notwithstanding, further reductions in carryunder are desired to enhance core stability and fuel element lifetimes. What is needed is a natural convection boiling water reactor system which reduces carryunder without requiring a larger reactor vessel and without reducing the volume flow of steam from the vessel or water through the core. In addition, the increased efficiency provided by such a reactor system should be achieved without substantial costs in terms of size, complexity or safety.

SUMMARY OF THE INVENTION

A reactor system includes channel means for trapping and evacuating bubbles from an annular region in the downcomer inlet and near the vessel wall. The channel means can include a single channel or multiple channels extending along the vessel wall. Preferably, the channel means comprises an annular series of tubes attached to the vessel wall. For each channel, bubbles enter an inlet near the downcomer inlet and rise through the channel to an outlet well above the nominal water level of the vessel. The entrance heights of the tubes are preferably randomized to avoid resonance phenomena which could disturb reactor stability.

In the course of the present invention, it was determined that a large percentage of bubbles emanating form the chimney moved primarily radially outward to the vessel wall. In general, large bubbles are forced upward by gravity and escape the recirculating flow; small bubbles are more likely to be swept into the downcomer by the recirculating flow. For intermediately sized bubbles, gravity and flow are mutually offsetting so that the primary motion of such bubbles is radially outward from the chimney and toward the vessel wall.

As these bubbles accumulate near the inlet of the downcomer, they reduce the cross-sectional area of the downcomer available for recirculating water to flow. This requires a greater velocity of water in the downcomer to maintain a given recirculation water volume. The greater water velocity increases the carryunder, resulting in shorter fuel burnups as explained above.

The channels provided by the present invention breakup the downward water flow of water in the downcomer near the vessel wall. Bubbles that would otherwise be trapped there can escape the recirculation flow through the channels. Since bubbles are escaping, there is less volume of steam within the downcomer. Thus, there is a larger cross-sectional area for water to flow so that a lower water velocity is required to maintain a fixed water volume flow. The lower water velocity results in less carryunder. The reduced carryunder results in smaller voids in the core and thus longer fuel burnups and greater core stability. These advantages are attained without increasing vessel size, reducing water volume flow or unduly increasing the complexity of the reactor vessel. These and other features and advantages of the present invention are apparent from the description below with reference to the following drawings.

DESCRIPTION OF THE PREFERRED EMBODIMENTS

Figure 1:
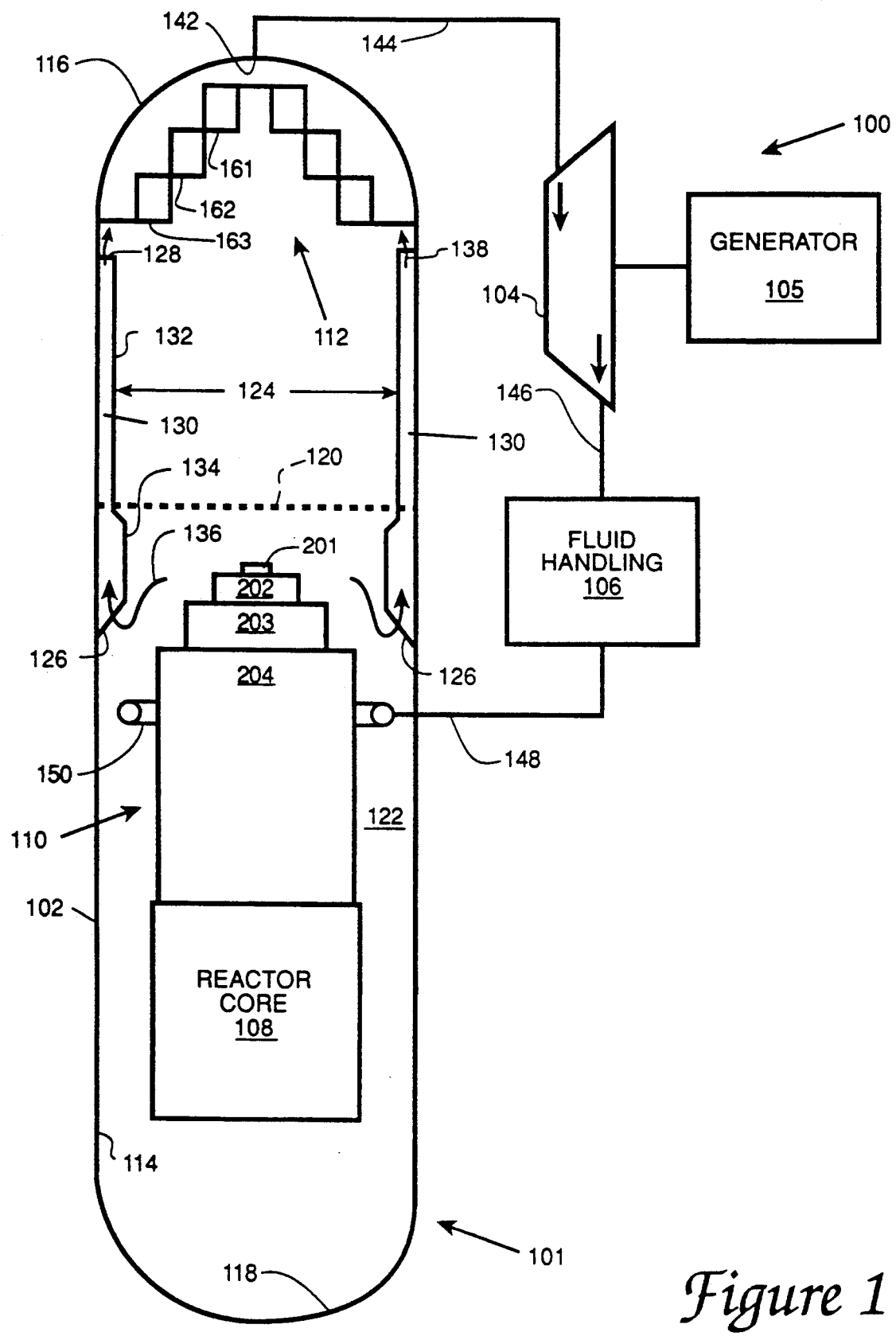
FIG. 1 is a schematic elevation view of a power generator system in accordance with the present invention.

A power generation system 100 includes a reactor system 101, a turbine 104, a generator 105, and a fluid handling section 106, as shown in FIG. 1. Reactor system 101 includes a reactor vessel 102 and its internals, e.g., a core 108, a chimney 110, and a dryer 112. Vessel 102 has a cylindrical wall 114 and a semispherical top 116 and a semispherical bottom 118. Vessel 102 has a nominal water level 120 to which it is filled normally for operation. Reactor core 108 and chimney 110 are below nominal water level 120 so that they are primarily immersed in water; dryer 112 is above level 120 so it is primarily immersed in steam during reactor operation. A downcomer 122 extends between vessel wall 114 and chimney 110 and core 108.

Figure 2:
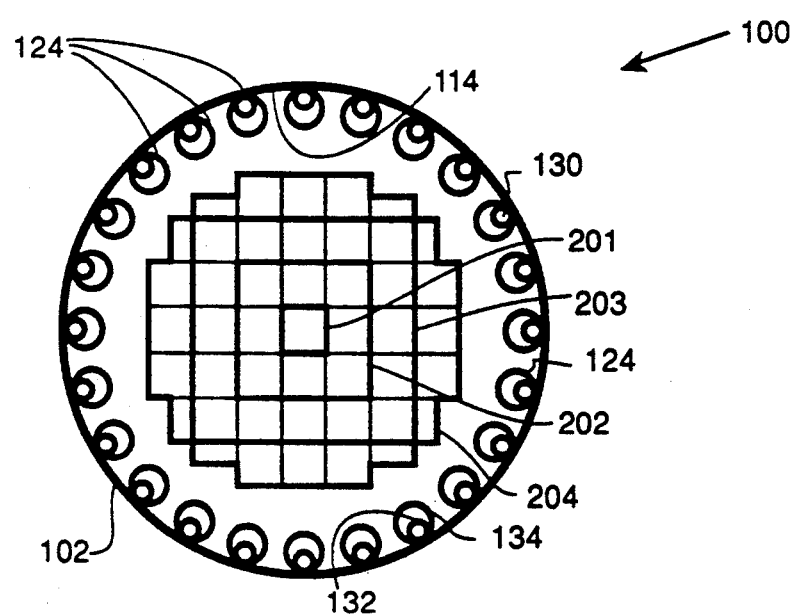
FIG. 2 is a schematic plan view of a chimney and vessel wall of the power generator system of FIG. 1.

Twenty-four tubes 124 are arranged in a circular series within vessel 102, which arrangement is conveyed in FIG. 2. Each tube includes an entrance 126 within downcomer 122 and an exit 128 well above nominal water level 120 and downcomer 122, as shown in FIG. 1. Each tube defines a channel 130 therewithin for the escape of steam from downcomer 122 to the vessel space above nominal water level 120.

Each tube 124 comprises a narrower upper section 132 and a wider lower section 134. Upper section 132 is narrow to minimally disturb fluid flow toward dryer 112. Lower section 134 is wider to provide disruption of the downward motion of fluid in downcomer 122 to enable steam to escape. In addition, the larger lower sections 134 provide wide sloped entrances 126 for capturing steam in the manner indicated by arrows 136. Steam exiting tubes 124 is indicated by arrows 138. Sections 132 and 134 are stainless steel and are fitted together with a conventional pipe joint. Tubes 124 are tack-welded to inner wall 114.

Chimney 110 includes forty-five chimney sections constituting four groups, a central first group 201, a second group 202, a third group 203 and a peripheral fourth group 204, as indicated in FIG. 2. Most of the chimney sections have square cross-sections. Fourth group 204 includes some half-size sections. The half-size sections allow chimney 110 to conform to wall 114 of vessel 102.

First group 201 includes a single section which is taller than the remaining forty-four sections, as indicated in FIG. 1. The height of group 201 defines a first group height or extension, which also defines the chimney height and the uppermost reach of downcomer 122. Second group 202 includes eight sections, radially outward and adjacent to the single section of first group 201. These eight second group sections share a common second group height less than the first group height but greater than the heights of the remaining more peripheral sections. Third group 203 includes sixteen sections. These third group sections are radially outward from and adjacent to second group 202 and share a common third group height which is less than the second group height. Fourth group 204 contains twenty sections, which are radially outward from and adjacent to third group 203. The sections of fourth group 204 share a common fourth group height less than the third group height. Since each group has a different height, chimney 110 is said to be staggered.

As indicated in FIG. 1, the difference between the second group height and the first group height is less than the difference between the third group height and the second group height. Likewise, the difference between the third group height and the second group height is less than the difference between the fourth group height and the third group height. In other words, the stagger of chimney 110 becomes steeper away from its axis.

Relative to an unstaggered chimney with the same height as group 201, staggered chimney 110 provides additional recirculation volume in downcomer 122 above outer chimney group 204. This additional volume at the top of downcomer 122 increases the time available for steam/water separation, reducing carryunder, and accommodates tubes 124, further reducing carryunder. Thus, staggered chimney configuration not only provides for reduced carryunder in its own right, but also makes the incorporation of release tubes 124 more favorable. Thus, there is a synergy between the use of staggered chimney 110 and tubes 124.

Specific dimensions for the illustrated embodiment are approximately as follows. Upper sections 132 are about 10 cm in diameter, while lower sections 134 are about 20 cm in diameter. Each tube 124 is about 300 cm long. The chimney heights are 300 cm, 290 cm, 265 cm and 225 cm, respectively, for groups 201-204. The height differences between the first and second group is 10 cm, between the second and third group is 25 cm, and between the third and fourth group is 40 cm. This corresponds to a stagger which becomes progressively steeper toward the periphery. Square sections are 25 cm on each side and group 204 is 175 cm from side to opposing side. Vessel 102 is about 12 meters high and 2.8 meters in diameter. Core 108 is 190 cm high, the top 10 cm being inactive, and about 180 cm from side to opposing side. Core 108 has an octagonal cross section and its base is 2.4 meters above the center of vessel bottom 118. These dimensions correspond to those of the 60 megawatt reactor at Dodewaard, Holland. Reactor vessel 102 can be of carbon steel inside a stainless steel cladding, while chimney 110 can be of stainless steel.

Generally, circulation within vessel 102 proceeds with water flowing up through core 108, which converts water to steam. The heated fluid flows up through chimney 110 and forces water above chimney 110 radially outward toward cylindrical wall 114. The water flows downward through downcomer 122. The water then flows below core 108, and upward again through core 108. Steam from chimney 110 proceeds upward past nominal water level 120, through dryer 112, out steam nozzle 142, and along steam line 144 to turbine 104. Turbine 104 is driven by the steam and, in turn, drives generator 105 to provide electricity.

Steam and condensation from turbine 104 proceed along fluid path 146 to fluid handling section 106. Fluid handling section 106 performs a variety of conventional functions including collection of condensation, preheating of the return water, and pumping of return water along to feedwater line 148 feedwater sparger 150 in vessel 102. Feedwater sparger 150 is a toroid which includes a multitude of horizontally directed nozzles through which feedwater enters the recirculation fluid, quenching the carryunder. The returned water replenishes water from vessel 102 which has been converted to steam and output to turbine 104.

In a reactor system with a conventional, unstaggered, chimney, water displaced by the output of more central sections quickly sweeps fluid exiting a peripheral chimney section into the downflow between the chimney and the vessel wall. For this reason, there is little time for steam from a peripheral section to escape the recirculating flow, resulting in significant carryunder. Of course, there is also less room for incorporation of release channels. In addition, an unstaggered chimney leaves little volume for flow separation for any of the sections. Thus, even more central sections contribute significant carryunder.

As is apparent from FIG. 1, staggering provides greater volume for steam to separate from the recirculating water flow: all the space between the tops of groups 202-204 and the level defined by the top of central group 201 is added to the volume available for separation. Furthermore, the flows from the different groups are largely decoupled. Note that the flow from outermost group 204 can proceed upward a considerable distance before being swept radially outward by the combined flow of radially inward groups 201, 202, and 203. This extra upward clearance translates into critical separation time for peripheral group 204. The relatively steep step between the two most peripheral groups 203 and 204 accentuates this advantage. In addition, the staggering provides decoupling and additional separation time for second and third groups 202 and 203. Furthermore, the flow from central group 201 has additional separation time due to the greater total volume outside the chimney.

In a complementary fashion, staggering reduces carryover. Since there is more height available between the top of group 204 and water level 120, there is more separation time available for water to separate from the steam flow toward top 116 of vessel 102. This applies to a lesser but significant extent, to the sections of intermediate groups 202 and 203.

Further reduction of carryover can be accomplished by using a dryer which is elevation-staggered in a manner complementary to the chimney 110. Dryer 112 includes three annular elements 161, 162, and 163. Central dryer element 161 is disposed higher than intermediate dryer element 162, that, in turn is disposed higher than peripheral dryer element 163. This contrasts with a conventional arrangement in which dryer elements are arranged like a disk so that they are all at the same height within vessel 102.

The illustrated staggered dryer 112 takes advantage of the otherwise wasted space defined by semispherical top 116. The advantage is most pronounced for central dryer element 161. Note that this dryer element 161 is the one most directly over central group 201, which is also the group provided the least carryover advantage by the staggering of chimney 110. In other words, while staggering chimney 110 does not add distance between the top of group 201 and water level 120, staggered dryer 112 does add distance between water level 120 and the dryer element most directly above group 201. The staggering of dryer 112 also provides benefits due to the higher position of intermediate dryer element 162. Peripheral dryer element 163 is at the height of a conventional dryer, but is most directly over the two peripheral groups 203 and 204, which have the least need for additional separation space above water level 120. Thus, staggered dryer 112 enhances the separation of water from the steam output and distributes this enhancement to provide separation where it is needed most.

The novel chimney geometry also improves the distribution of heat transfer from reactor core 108. Being a conventional core, core 108 is generating more power in its center and less power toward its periphery. Optimal heat removal would require heat to be removed faster from the core center and more slowly from the core periphery. This occurs to some extent in a conventional natural circulation boiling water reactor due to the greater heat flux at the core center between core and water. However, this temperature differential effect is not sufficient to provide optimal heat transfer distribution through the core.

The present configuration more closely approaches optimal heat transfer by forcing water faster through the core center. For example, since group 201 is higher than other sections, it supports a taller column of steam. The taller column of steam results in a greater pressure differential between the fluid through the core and chimney and the water in the downcomer. The greater pressure differential results in a faster fluid flow through central group 201 and the core center directly below. On the other hand, sections of peripheral group 204 support relatively short steam columns. This results in smaller pressure differentials and slower fluid flow through peripheral chimney sections and peripheral core regions below. Thus flow differences supplement the differences between density differentials among groups 201–204 to enhance the transfer of heat from core 108. Furthermore, reduced carryunder also enhances the ability of the recirculating water to remove heat from the core.

Thus, the provision of channels 124, in conjunction with the stagger chimney configuration, reduces carryunder, yielding improved system efficiency. Reduced carryunder results in smaller core voids, and, thus, greater flow stability and greater margins for safety. These advantages are obtainable without additional pumps, control loops or other items which might add to system complexity or diminish the inherent safety of the system.

The present invention provides a range of embodiments not described above. The release channel can be provided by a series of tubes, as in the preferred embodiment, or by a shroud or lining spaced from the vessel wall. The shroud can provide a single release channel or can be sectioned to provide multiple channels. The release structure can be welded or otherwise attached to the wall. Alternatively, the tubes can be mounted together on a frame which is in turn attached to the vessel wall. This later arrangement can provide more ready access to the vessel internals for maintenance.

Different dimensions, materials, and power capabilities are provided for. It is not necessary that the reactor be a nuclear reactor or be used for generating electricity. The core can used fission, fusion, or other process for generating heat. Heat from the reactor can be used for some other purpose without an intermediate conversion in form. Coolants in addition to or other than water can be used. Steam or vapor used to transfer heat from a vessel can be recollected and returned to replenish fluid in the vessel. Alternatively, replenishment can be partially or completed effected by a separate fluid source. The invention can be practiced with or without a staggered dryer and with or without a staggered chimney. The reactor vessel can have different geometries, for example, the top and bottom need not be semispherical and the diameter of the vessel wall need not be constant over its height. These and other modifications to and variations upon the described embodiments are provided for by the present invention, the scope of which is limited only by the following claims.

What is claimed is:

1. A reactor system comprising: conversion means for converting kinetic energy of vapor flow into another form of energy; and a natural-circulation reactor relying on free-surface separation to extract a vapor phase, and said reactor including a reactor vessel for containing a heat-transfer fluid having a liquid phase and a vapor phase, said vessel having a vapor exit for outputting vapor generated within said vessel, said vessel having a liquid input for inputting liquid into said vessel, said vessel having a nominal liquid level, a reactor core for generating heat, said core being disposed within said vessel, said core being adapted for converting liquid flowing therethrough to vapor, said core having a bottommost core extent and a top most extent, a chimney disposed within said vessel, said chimney extending from said core to a level below said nominal liquid level, said chimney having structural section means defining vertically extending sections, each of said sections extending vertically from said core to a level below said nominal liquid level, each of said sections radially confining fluid flowing therethrough, said section defining a radially extending array, said array including at least first and second groups of said sections, said first group including at least one of said sections, said structural section means dividing said second group into plural substantially equal sections arranged annularly about said first group so that each of said sections in said second group is in contact with two other sections of said second group, the sections of said first group having a first average height, the sections of said second group having a second average height which is less than said first average height, a downcomer providing a return path for fluid exiting said chimney to return to said core, said downcomer extending at least from said first average height at least to said bottommost core extent, said downcomer extending radially from said core and said chimney to said sidewall, and channel means for evacuating vapor from said downcomer generally upward and along said sidewall, said channel means being disposed within said vessel and adjacent to said sidewall, said channel means having at least one entrance with a mean entrance height between said first average height and said second average height, said channel means having exits only in the space above said liquid level, said channel means having a lowest extent above said liquid input and above said topmost extent of said core;

transfer means for transferring vapor from said vapor exit to said conversion means, said transfer means being in fluid communication with said vapor exit and said conversion means; and replenishment means for supplying a liquid to replace fluid transferred to said conversion means so as to maintain a relatively constant liquid level within said vessel, said replenishment means being in fluid communication with said vessel through said liquid input.

2. A reactor system as recited in claim 1 wherein said channel means comprises a circular series of tubes.

* * * * *